(12) United States Patent
Alvarez et al.

(10) Patent No.: US 7,308,840 B2
(45) Date of Patent: Dec. 18, 2007

(54) TORSIONAL DAMPER FOR A TRANSMISSION OUTPUT SHAFT

(75) Inventors: Francisco Alvarez, Belleville, MI (US); Charles Poon, Canton, MI (US); David Pariseau, Royal Oak, MI (US); Matthew Vance, Dearborn, MI (US); Craig Smith, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 11/160,986

(22) Filed: Jul. 19, 2005

(65) Prior Publication Data

US 2007/0017768 A1 Jan. 25, 2007

(51) Int. Cl.
*F16F 15/12* (2006.01)
(52) U.S. Cl. .................... 74/574.4; 74/411
(58) Field of Classification Search .......... 192/55.2, 192/55.3; 74/574.4
See application file for complete search history.

(56) References Cited

U.S. PATENT DOCUMENTS

| 1,984,413 | A | * | 12/1934 | Lee | .............. 188/2 R |
|---|---|---|---|---|---|
| 2,834,226 | A | * | 5/1958 | Hirst | ............ 74/574.4 |
| 2,878,689 | A | * | 3/1959 | Aebersold | ........ 74/574.4 |
| 3,848,694 | A | | 11/1974 | Matsui et al. | |
| 4,114,472 | A | | 9/1978 | Hornig et al. | |
| 4,825,983 | A | | 5/1989 | Nakanishi | |
| 4,884,666 | A | | 12/1989 | Stahl | |
| 5,214,975 | A | | 6/1993 | Zalewski | |
| 6,547,053 | B2 | | 4/2003 | Shih | |

* cited by examiner

*Primary Examiner*—Richard M Lorence
(74) *Attorney, Agent, or Firm*—David B. Kelley; Brooks Kushman P.C.

(57) ABSTRACT

A torsionally tuned damper assembly for a geared power transmission is disclosed. The damper assembly, at a power output end of a transmission power output shaft, has an inertia ring with a calibrated natural torsional frequency that reduces the resonance energy developed by gear rattle forces at a transmission gear mesh.

4 Claims, 2 Drawing Sheets

TORSIONAL DAMPER FOR A TRANSMISSION OUTPUT SHAFT

BACKGROUND OF THE INVENTION

1. Field of the Invention

This invention relates to a vibration damper for attenuating gear rattle due to torsional vibrations in a power output shaft for a geared transmission.

2. Background Art

In a power transmission mechanism for an automotive vehicle, a vehicle engine delivers driving power to a transmission power output shaft through multiple torque flow paths defined by torque transmitting gearing. In the case of a manually-controlled multiple-ratio transmission, the torque flow paths are established and disestablished by torque delivery transmission synchronizers and an engine clutch with an engine torsional vibration damper. The transmission power output shaft is subjected to high frequency torque disturbances due to the combustion forces of the engine transmitted through the engine clutch and inertia forces developed by the gears at each gear mesh. The forces at a gear mesh to which the power output shaft is subjected are referred to commonly as gear rattle forces.

The meshing engagements of the teeth of individual transmission gear elements, of necessity, have a degree of backlash since a zero backlash gear mesh would result in unacceptable gear tooth forces at the gear tooth surfaces. The gear elements, which typically have involute profiles, require a predetermined backlash condition to compensate for dimensional changes in the gearing geometry due to temperature changes in transmission lubricating fluid during normal vehicle operation. A so-called gear rattle condition is a result of the pre-designed backlash at each gear mesh. The gear rattle resulting from torsional vibration, as well as torsional vibrations resulting from the engine combustion forces transferred through the clutch damper, cause transmission power output shaft torsional vibrations.

The transmission power output shaft has a natural resonant torsional vibration frequency. The rotary speed of the transmission power output shaft at which that resonant frequency occurs depends upon the shaft geometry, the inertia mass of transmission components connected to the shaft and the characteristics of the clutch torsional vibration damper.

In a typical automotive power transmission mechanism in contemporary automotive powertrains, a transmission power output shaft resonant frequency may occur at intermediate transmission output shaft speeds between 1,000 rpm and 2,000 rpm. A typical resonant frequency for a power output shaft in a contemporary automotive transmission may be approximately 68 Hz, which may occur at about 1,375 rpm.

Attempts have been made to attenuate the torsional vibrations in a rotary power delivery shaft in various driveline environments by mounting on the shaft a torsional damper with a natural resonant frequency that can be tuned to counteract the natural resonant frequency of the shaft. An example of a damper of this type is disclosed in U.S. Pat. No. 3,848,694, which is specifically designed for eliminating torsional vibrations resulting from a differential gearing in a differential and axle assembly to which an engine driven driveshaft would be connected in a vehicle driveline. It is intended to attenuate gear noise created by the differential gearing. A gear noise condition, however, is a phenomenon that is different than a gear rattle condition, which is the condition with which the present invention is concerned.

The device of the '694 patent would be incapable of attenuating torsional vibrations in a transmission power output shaft caused by gear tooth impact and gear rattle at a gear mesh.

U.S. Pat. No. 4,884,666 is an example of another design approach for using a torsional damper for an automotive vehicle driveshaft at a location in the driveline remote from the transmission itself. The design of the '666 patent is intended to deal with gear noise in an axle rather than gear rattle due to torsional vibrations. The damper of the '666 patent is mounted at a selected location on an automotive driveshaft, which is formed in two pieces. The adjacent ends of each driveshaft piece of that design are secured together by the damper assembly, each adjacent end being welded to opposite sides of the damper assembly.

SUMMARY OF AN EMBODIMENT OF THE INVENTION

The improved damper assembly of the present invention is capable of tuning an automotive vehicle driveline to attenuate gear rattle due to torsional vibrations in the gearing of the transmission. The torsional damper of the invention is located directly at the output side of the transmission and is tuned at a calculated damper frequency that is out-of-phase with the torsional resonant frequency of a transmission power output shaft. This enables the damper to oppose and attenuate the resonant torsional vibration of the power output shaft while the transmission is operating in a gear ratio in which the torsional vibration problem is most severe; e.g., in first or second gear ratio. It is capable also of avoiding powertrain bending frequencies often associated with driveshaft dampers of known design.

The resonant frequency of the damper assembly of the invention and the clutch torsional damper system is designed with a minimum hysteresis to better identify the resonant frequency in each gear ratio. The tuning of the damper assembly of the invention takes into account also the effect of the engine flywheel inertia of the on the engine torsional vibrations due to engine combustion forces.

The damper assembly of one embodiment of the invention is secured to a transmission power output shaft directly adjacent a transmission housing. A transmission driveshaft flange is splined at the torque output end of the transmission output shaft, and an inertia ring is supported by the output shaft flange. A polymer, preferably (EPDM), is located in and adhered to a hub of the inertia ring. A sleeve within the inertia ring hub, to which the polymer adheres, is press-fitted on a cylindrical shoulder on the power output shaft flange, preferably by a press fit. The mass of the inertia ring and its diameter are chosen so that the natural frequency of the damper assembly will correspond to the natural frequency of the transmission power output shaft and its associated rotating components. The natural frequency of the damper assembly can be calibrated using the well-known equation:

$$\text{Frequency} = C \cdot \frac{1}{2\pi} \cdot \frac{\sqrt{k}}{I}$$

where: k is the stiffness factor, C is a calibration constant, and I is an inertia term, which is a function of mass.

The damper assembly of the invention is torsionally tuned to provide destructive interference with the resonance energy transmitted by the transmission clutch damper and other transmission components. The polymer that is chosen has a durometer value appropriate to the desired natural torsional resonant frequency of the damper assembly. That frequency is the same as the torsional resonant frequency of the transmission power output shaft and its associated components, but it is of opposite phase, thereby reducing or eliminating gear rattle energy.

The damper assembly of the invention is located strategically relative to the transmission output shaft to reduce noise by minimizing stiffness effects of driveline or transmission components located between the damper assembly and the gear mesh that would be the principal source of gear rattle energy. Its location also reduces any effect of powertrain bending frequencies often associated with driveshaft dampers of known design.

PARTICULAR DESCRIPTION OF AN EMBODIMENT OF THE INVENTION

Figure 1:
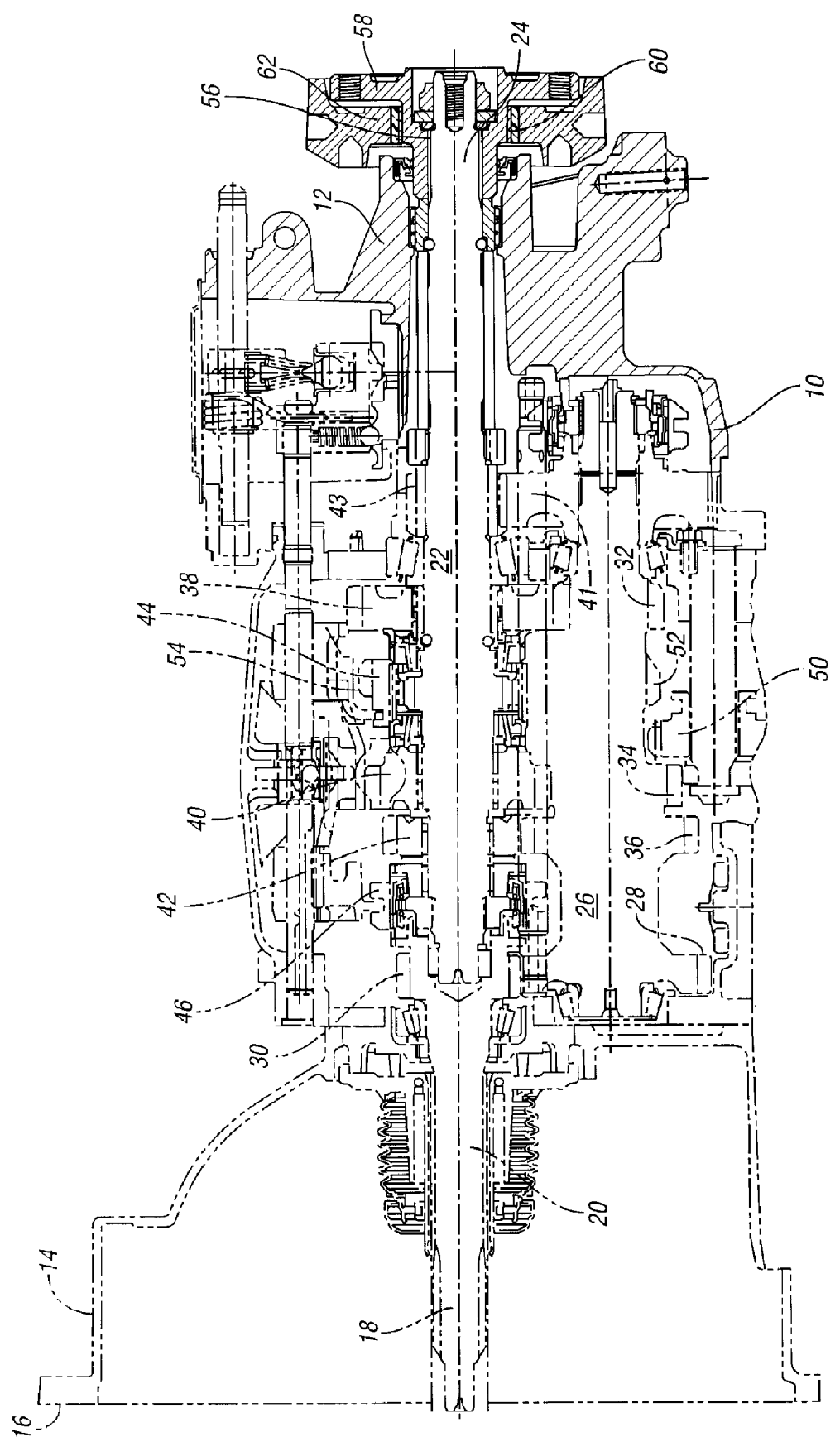
FIG. 1 is a cross-sectional view of a multiple-ratio manual transmission for an automotive vehicle with a rear wheel drive configuration.

FIG. 1 shows a cross-sectional view of a manual transmission for use in an automotive vehicle powertrain. The transmission of FIG. 1 includes a housing 10 with a rearward housing portion 12 and a forward housing portion 14, which sometimes is referred to as a transmission bell housing. The periphery of the housing portion 14, as shown at 16, can be bolted to an engine block for an internal combustion engine. An engine crankshaft and an engine flywheel are driveably connected to the torque input end 18 of a transmission input shaft 20. The connection with the engine is established by a friction clutch assembly (not shown).

The friction clutch assembly would include a clutch disk, a clutch spring damper of known construction and a clutch housing, which defines in part the engine flywheel.

A transmission output shaft, which sometimes is referred to as a main shaft, is shown at 22. The right-hand end of the main shaft 22, shown at 24, extends through a shaft opening in the housing portion 12.

A transmission countershaft 26 is journalled by end support bearings in the housing in parallel disposition with respect to the main shaft 22. Countershaft 26 has an input gear element 28, which driveably engages a torque input gear 30, which forms a part of transmission input shaft 20.

A first low speed ratio gear element 32, an intermediate speed ratio gear element 34 and a third speed ratio gear element 36 are formed on the countershaft 26 to define a countershaft gear assembly.

First gear ratio gear element 32 driveably engages main shaft gear 38, which is journalled on main shaft 22. Gear element 34 of the countershaft gear assembly driveably engages second ratio main shaft gear 40. Countershaft gear element 36 driveably engages third ratio gear 42 journalled on main shaft 22. Countershaft gear element 41 continuously meshes with torque output gear 43 on main shaft 22.

To establish first speed ratio operation, a synchronizer sleeve 44 is shifted in a right-hand direction, as viewed in FIG. 1, thereby locking first speed ratio gear 38 to the main shaft 22. Torque input gear 30 is continuously engaged with gear element 28 of the countershaft gear assembly. Engine torque thus is distributed through gear 30, through gear element 28 and through gear element 32 and gear 38 to the main shaft 22.

To establish second gear ratio operation, the synchronizer sleeve 44 is shifted in left-hand direction, thereby locking second ratio gear 40 to the main shaft 22. The meshing engagement of second ratio countershaft gear element 34 with the second ratio gear 40 then will transfer a driving torque to the main shaft 22.

To establish third speed ratio operation, both synchronizer sleeve 40 and synchronizer clutch sleeve 44 are shifted to an intermediate neutral position, and synchronizer sleeve 46 is shifted in a right-hand direction, thereby locking third ratio gear 42 to the main shaft 22. Driving torque then is distributed from countershaft gear element 36 and through gear 42 to the main shaft 22.

Fourth ratio operation is achieved by shifting a synchronizer sleeve 46 in a left-hand direction, thereby driveably connecting directly the input gear 30 with the main shaft 22. This is a direct drive connection with a speed ratio of unity.

Reverse drive is achieved when the synchronizer sleeves are in their respective neutral positions by shifting reverse drive pinion 50 in a right-hand direction to effect a driving connection with reverse drive gear element 52 on countershaft 26. Simultaneously, reverse drive pinion 50, which is slidably supported on a reverse pinion support shaft, driveably engages reverse drive gear 54 formed on the synchronizer clutch sleeve 44. Reverse drive torque then is distributed from the reverse drive gear element 52, through the pinion 50 and through the reverse drive gear 54 to the main shaft 22.

Figure 1A:
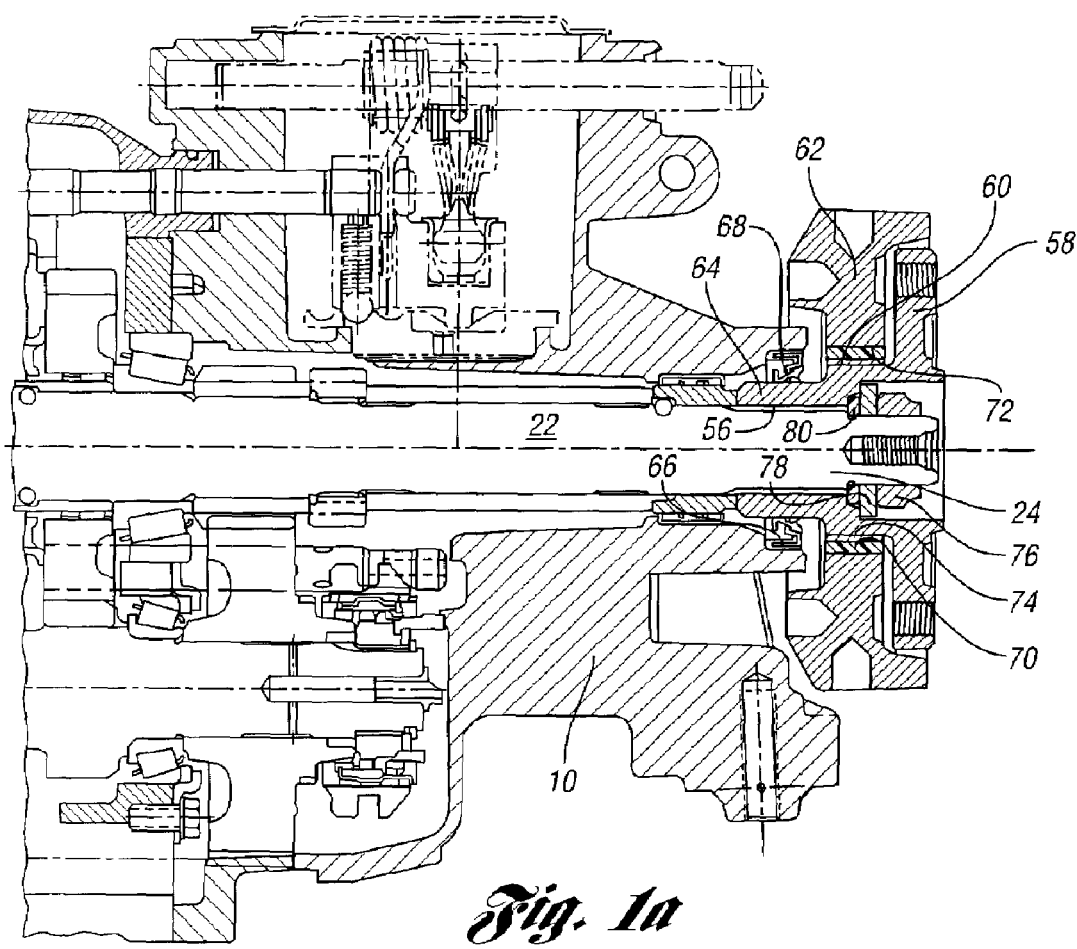
FIG. 1a is a detail view of the rearmost section of the transmission of FIG. 1 showing the damper assembly of the invention located at the torque output end of the transmission power output shaft.

The torque output end 24 of the main shaft 22 is splined at 56 to the hub portion 64 of a drive flange 58, as seen in FIG. 1a. A vehicle driveshaft (not shown) can be bolted to the flange 58.

The hub 64 of flange 58 defines a cylindrical surface 60, which is received in a central opening formed in an inertia damper ring 62.

As best seen in FIG. 1a, the hub portion 64 of flange 58 is internally splined at 56. It is received in a seal opening 66 in the torque output end of the housing 10. A seal 68 surrounding the hub 64 seals the opening for the damper assembly.

A polymer ring 70 surrounds the hub portion 64 of the flange 58. It is located in a central opening 72 in the damper ring 62. Polymer ring 70 is bonded within the central opening of the damper ring 62, and a sleeve, preferably made of steel, is located within the polymer ring, as shown at 74.

During assembly of the transmission, the ring 74 is press-fitted on the hub portion 64 of the flange 58. The end 24 of the main shaft 22 is threaded to receive a locking nut 76, which engages a retainer washer 78. A seal 80 surrounds the output shaft end 24 adjacent the washer 78.

Figure 2:
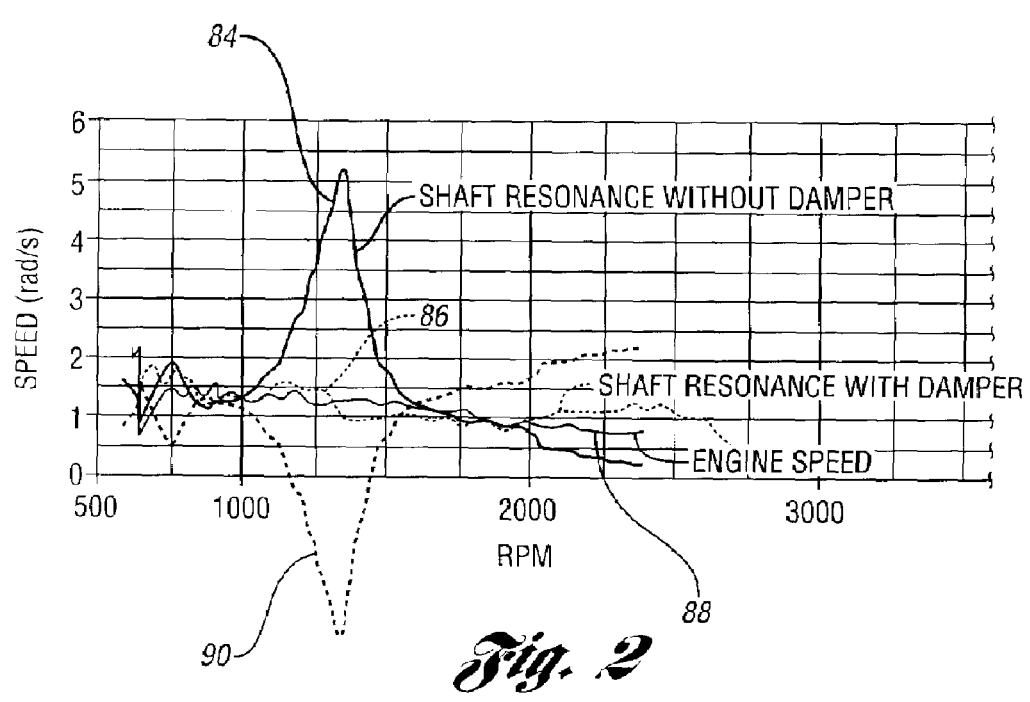
FIG. 2 is a plot showing an output shaft torsional vibration trace, an engine speed trace and a transmission output shaft speed trace, both with a damper assembled and without a damper assembled.

FIG. 2 shows a plot in which shaft angular velocity is illustrated by various traces at various speeds. A speed of approximately 1,300 rpm, shown by the trace 84, corresponds to a frequency of approximately 65 Hz, which is determined by the engine primary firing order. The trace, shown at 84, is developed by the transmission shown at FIG. 1 without the damper assembly of the present invention. If the damper assembly is assembled to the transmission, as shown in FIG. 1, the transmission rotating shaft resonance is shown by the trace 86. The peak of the resonance trace 86 is significantly lower than the peak of the resonance trace 84.

For purposes of comparison, the engine speed fluctuations are illustrated in FIG. 2 by the trace 88.

The damper assembly of the invention is tuned so that it will counteract and oppose the peak transmission power output shaft resonance, shown by the trace plot 84. The resonance trace plot for the damper assembly of the invention is illustrated in FIG. 2 by the trace 90. In general, the trace 90 would be a mirror image of the trace 84. The dynamic energy of the damper assembly of the invention, when the system is tuned, will cancel the dynamic energy of the transmission output shaft torsional vibrations.

The resonant frequency of the transmission power output shaft, when it is identified by a trace such as that shown in FIG. 2, will establish the design goal for the damper assembly of the invention. For a given outside diameter for the inertia damper ring, which is determined in part by transmission packaging constraints in an automotive vehicle installation, the mass of the damper ring 62 is established and a polymer material of appropriate durometer number is chosen so that the natural frequency of the transmission main shaft will be matched by an out-of-phase computed natural frequency of the damper assembly, as explained previously, using the expression:

$$\text{Frequency} = C \cdot \frac{1}{2\pi} \cdot \frac{\sqrt{k}}{I}$$

where C is a calibration constant, k is a stiffness factor and I is the moment of inertia that depends upon mass.

Although an embodiment of the invention has been described, it will be apparent to persons skilled in the art that modifications may be made without departing from the scope of the invention. All such modifications and equivalents thereof are considered to be within the scope of the following claims.

What is claimed is:

1. A torsionally tuned damper assembly in combination with an automotive vehicle powertrain, including a neared transmission with a transmission power output shaft;

the transmission having a power output flange driveably connected to the transmission power output shaft for accommodating a driving connection between the transmission power output shaft and a vehicle driveshaft;

the tuned damper assembly comprising a damper inertia ring adjacent the power output flange in concentric disposition with respect to the transmission power output shaft;

a central opening in the inertia ring;

a resilient polymer adhered to the inertia ring in the central opening in the inertia ring to form an inertia ring assembly;

means for effecting a secure mechanical driving connection between the polymer and the transmission power output shaft;

the inertia ring having a diameter and an effective mass with a natural torsional frequency that opposes and is approximately equal in magnitude to a resonance frequency of the transmission power output shaft at output shaft speeds between 1000 rpm and 2000 rpm whereby destructive interference energy of the tuned damper assembly attenuates resonance energy transmitted by the transmission power output shaft;

the mass and dimensions of the inertia ring being calibrated to establish a torsional resonant vibration frequency that is substantially out-of-phase with respect to torsional resonant vibration frequency established by a gear rattle effect developed by a gear mesh for gearing of the transmission and by transmission components connected to the torsionally tuned damper assembly.

2. The torsionally tuned damper assembly set forth in claim 1 wherein the power output flange includes a flange hub with a splined central opening for effecting a driving spline connection with the transmission power output shaft, the flange hub having a cylindrical outer periphery, the inertia ring assembly being secured to the flange hub by a press fit during assembly of the power output flange and the inertia ring assembly.

3. The torsionally tuned damper assembly set forth in claim 1 wherein the torsional resonant frequency of the tuned damper assembly is approximately 65 c.p.s. at a speed of approximately 1300 rpm of the transmission power output shaft.

4. The torsionally tuned damper assembly set forth in claim 2 wherein the torsional resonant frequency of the tuned damper assembly is approximately 65 c.p.s. at a speed of approximately 1300 rpm of the transmission power output shaft.

* * * * *